United States Patent
Rathsack

(10) Patent No.: US 7,627,980 B2
(45) Date of Patent: Dec. 8, 2009

(54) SNELL HOLDING AND STORING DEVICE

(75) Inventor: Michael J. Rathsack, 4972 Edge O Woods Dr., West Bend, WI (US) 53095

(73) Assignees: Michael J. Rathsack; Carl F. Krueger

( * ) Notice: Subject to any disclaimer, the term of this patent is extended or adjusted under 35 U.S.C. 154(b) by 0 days.

(21) Appl. No.: 12/099,389

(22) Filed: Apr. 8, 2008

(65) Prior Publication Data

US 2008/0244957 A1    Oct. 9, 2008

Related U.S. Application Data

(60) Provisional application No. 60/910,725, filed on Apr. 9, 2007.

(51) Int. Cl.
*A01K 97/06* (2006.01)
(52) U.S. Cl. ............................. 43/57.2; 43/57.1
(58) Field of Classification Search .................. 43/57.2, 43/57.1, 54.1
See application file for complete search history.

(56) References Cited

U.S. PATENT DOCUMENTS

| | | | | | |
|---|---|---|---|---|---|
| 742,040 | A * | 10/1903 | Kurtz, Sr. | .................... | 43/57.2 |
| 1,850,074 | A * | 3/1932 | Crandall | .................... | 43/54.1 |
| 1,884,805 | A * | 10/1932 | Moritz | .................... | 242/599.4 |
| 2,225,309 | A * | 12/1940 | Lawrence | .................... | 43/57.2 |
| 2,514,697 | A * | 7/1950 | Ellis | .................... | 242/141 |
| 2,517,866 | A * | 8/1950 | Glahn | .................... | 43/57.1 |
| 2,596,896 | A * | 5/1952 | Goad | .................... | 43/57.2 |
| 2,638,699 | A * | 5/1953 | Seeburg | .................... | 43/57.2 |
| 2,657,497 | A * | 11/1953 | Beaver | .................... | 43/57.1 |
| 2,667,010 | A * | 1/1954 | Anderson | .................... | 43/57.2 |
| 2,670,563 | A * | 3/1954 | Anderson | .................... | 43/57.2 |
| 2,670,564 | A * | 3/1954 | Keener | .................... | 43/57.2 |
| 2,675,640 | A * | 4/1954 | Adamek | .................... | 43/57.1 |
| 2,693,662 | A * | 11/1954 | Norton et al. | .................... | 43/57.1 |
| 2,702,442 | A * | 2/1955 | Wallen | .................... | 43/57.1 |
| 2,706,871 | A * | 4/1955 | Ritchie | .................... | 43/57.1 |
| 2,716,302 | A * | 8/1955 | Dutton | .................... | 43/57.1 |
| 2,743,546 | A * | 5/1956 | Crist | .................... | 43/54.1 |
| 2,744,353 | A * | 5/1956 | Adams | .................... | 43/57.3 |
| 2,756,946 | A * | 7/1956 | McAuley | .................... | 43/57.1 |
| 2,789,389 | A * | 4/1957 | Moen | .................... | 43/57.2 |
| 2,813,368 | A * | 11/1957 | Knowles | .................... | 43/57.1 |
| 2,814,152 | A * | 11/1957 | Trujillo | .................... | 43/57.1 |
| 2,879,619 | A * | 3/1959 | Peterson | .................... | 43/57.2 |

(Continued)

FOREIGN PATENT DOCUMENTS

DE     10260708 A1 *   5/2005

(Continued)

*Primary Examiner*—Darren W Ark
(74) *Attorney, Agent, or Firm*—Joseph S. Heino; Patrick M. Bergin

(57) ABSTRACT

A snell holding and storing device comprises an inner holder portion and an outer holder portion. The inner holder portion includes a snell holder that extends downwardly and into the outer holder portion when the inner portion and the outer portion are attached to one another. Preferably, the outer holder portion is comprised of a material that allows the user to visualize the contents of the device. The snell holder provides a plurality of transversely-disposed and circumferentially-cut slots for retention of a snell within such slots.

11 Claims, 4 Drawing Sheets

U.S. PATENT DOCUMENTS

| | | | | |
|---|---|---|---|---|
| 2,927,395 A * | 3/1960 | Bartlett | | 43/57.2 |
| 3,008,664 A * | 11/1961 | McCormick | | 43/54.1 |
| 3,022,600 A * | 2/1962 | Glascoff | | 43/57.1 |
| 3,166,866 A * | 1/1965 | Norton et al. | | 43/57.1 |
| 3,180,053 A * | 4/1965 | Norton et al. | | 43/57.2 |
| 3,377,737 A * | 4/1968 | Campbell | | 43/57.1 |
| 3,378,134 A * | 4/1968 | Wilkinson et al. | | 43/54.1 |
| 3,890,737 A * | 6/1975 | Jones | | 43/57.2 |
| 3,947,991 A * | 4/1976 | Morcom | | 43/54.1 |
| 4,514,928 A * | 5/1985 | Hanson | | 43/57.2 |
| 4,563,834 A * | 1/1986 | Spencer | | 43/57.1 |
| 4,583,315 A * | 4/1986 | Schreck | | 43/57.2 |
| 4,769,941 A * | 9/1988 | Schmidt | | 43/57.1 |
| 4,791,752 A * | 12/1988 | Van Kampen | | 43/57.2 |
| 5,018,298 A * | 5/1991 | Spears | | 43/57.2 |
| 5,025,588 A * | 6/1991 | Echols | | 43/57.1 |
| 5,033,228 A * | 7/1991 | Gallivan | | 43/54.1 |
| D335,216 S * | 5/1993 | Carlson | | D3/260 |
| 5,542,206 A * | 8/1996 | Lisch | | 43/57.1 |
| 5,544,442 A * | 8/1996 | Perkins | | 43/57.2 |
| 5,584,138 A * | 12/1996 | Newberg | | 43/57.1 |
| D378,396 S * | 3/1997 | Sandberg et al. | | D22/134 |
| 5,657,573 A * | 8/1997 | Fischer et al. | | 43/57.2 |
| 5,802,760 A * | 9/1998 | Campbell | | 43/54.1 |
| 5,934,010 A * | 8/1999 | Blackburn | | 43/57.1 |
| 5,934,464 A * | 8/1999 | Vargo et al. | | 43/57.1 |
| 6,219,958 B1 * | 4/2001 | Eberts | | 43/57.2 |
| 6,481,150 B1 * | 11/2002 | Mahowald | | 43/57.2 |
| 6,962,020 B2 * | 11/2005 | Gonzalez | | 43/57.2 |
| 7,069,687 B2 * | 7/2006 | Jang | | 43/57.1 |
| 2004/0074136 A1 * | 4/2004 | Moss | | 43/57.1 |
| 2007/0220801 A1 * | 9/2007 | Clawson | | 43/57.1 |
| 2008/0134566 A1 * | 6/2008 | Greaves et al. | | 43/57.2 |
| 2008/0271361 A1 * | 11/2008 | Greaves | | 43/57.1 |

FOREIGN PATENT DOCUMENTS

| | | | |
|---|---|---|---|
| FR | 2761231 A1 * | 10/1998 | |
| FR | 2767025 A1 * | 2/1999 | |
| JP | 09238606 A * | 9/1997 | |
| JP | 09294519 A * | 11/1997 | |
| JP | 2000308450 A * | 11/2000 | |
| JP | 2001017050 A * | 1/2001 | |
| JP | 2001095450 A * | 4/2001 | |
| JP | 2002209490 A * | 7/2002 | |
| JP | 2004113122 A * | 4/2004 | |
| JP | 2004313100 A * | 11/2004 | |
| JP | 2005185118 A * | 7/2005 | |
| JP | 2008109890 A * | 5/2008 | |
| JP | 2008173051 A * | 7/2008 | |
| WO | WO 2004026027 A1 * | 4/2004 | |
| WO | WO 2006048591 A1 * | 5/2006 | |

* cited by examiner

SNELL HOLDING AND STORING DEVICE

This application claims the benefit and priority of U.S. Provisional Patent Application No. 60/910,725 filed Apr. 9, 2007.

FIELD OF THE INVENTION

The present invention relates generally to the art and sport of fishing and to devices and accessories that are used by anglers during fishing excursions. More particularly, the present invention relates to a device that can be used by an angler to safely and securely hold and store fishing snells and leaders, such snells and leaders including attached lures and the like, when such are not in use. The present invention also specifically relates to a sealable holding and storing device that allows the angler to view the contents of the device for the purpose of selecting a snell that may be held and stored within the device prior to opening the device.

BACKGROUND OF THE INVENTION

Fishing has evolved from being a means for human survival in ancient times to being a competitive and recreational sport in modern times. In the field of sport and recreational fishing, a fishing line, hook and some sort of natural or artificial bait have always been, and still are, the absolutely necessary elements for attempting a successful fishing outing. In the art of sport fishing, a "lure" is an object that is attached to the end of the fishing line and is designed to look and move much like live bait when drawn through the water either by winding retrieval of the line by the angler's reel or by movement of a trolling boat that is pulling the lure behind it. The lure is typically equipped with hooks that set in the fish's mouth when the fish attacks or bites on the lure. The hooks are inherently sharp so as to perform their intended function of penetrating a portion of the fish's mouth and maintaining its attachment to the hook until the fish is netted or landed.

The typical lure, including the basic fishhook, is formed with an eye at its shank end. This eye is used to attach the fishhook or lure to the primary fishing line that is wound upon a reel and fed through rings along the length of a fishing rod blank or pole. Many anglers, however, prefer to attach a lure to the fishing line using a "snell," which is a shorter length of secondary fishing line that connects the lure to the substantially longer principal fishing line. Doing so saves the angler much time and effort by being able to quickly and easily switch lures when such is desired or required. Without the use of snells, the angler would need to tie the lure to the primary line each time a lure is changed up for another. This is time consuming and particularly difficult to do in conditions that are dark and wet where the lure may not be properly attached, thus risking loss of both the lure and a trophy fish that might be hooked by the lure.

In the experience of this inventor, the use of snells is not without its own set of problems, however. By their very nature, snells can easily become tangled with other snells and other fishing gear that resides in the bottom of the angler's tackle box or in the bottom of a fishing boat. If not properly stowed away, snells can become tangled to the point that they become more or less unusable to the angler. Perhaps even more importantly, tangled masses of snells present a hazard to the angler whose fingers and hands can be pierced by the sharp hooks that are attached to the lures. Accordingly, it is desired in the sport of fishing to devise ways to keep snells from becoming tangled while also allowing them to be easily retrieved for use.

Prior attempts have been made to devise snell holders of various construction. In the experience of this inventor, however, none of the snell holders of the prior art permit the quick and easy removal of an individual snell from the holder. Another shortcoming is the inability to attach a leader to the holder, a leader not having a hooked element to it. Moreover, none of them permit the reliable wrapping of a snell without the risk of snagging of the hooks of a lure during either wrapping or removal of the snell from the holder.

SUMMARY OF THE INVENTION

Accordingly, it is an object of the present invention to provide a snell holding and storing device that provides for the quick and easy attachment of an individual snell to a portion of the device. It is another object of the present invention to provide such a snell holding and storing device that also permits the reliable wrapping of a snell without the risk of snagging of the hooks of the lure during wrapping or removal of the snell from the holder. It is yet another object of the present invention to provide such a snell holding and storing device that allows a plurality of snells to be held and stored in this fashion. It is yet another object of the present invention to provide such a snell holding and storing device that also allows non-hook bearing leaders to be securely attached to the device. It is still another object of the present invention to provide such a snell holding and storing device that is made from a minimal number of elements and that requires a minimal number of steps to use. It is yet another object of the present invention to provide such a snell holding and storing device that is durable and sturdy for use in the field. It is still another object of the present invention to provide such a snell holding and storing device that includes a clear, see-through portion such that the snells being held and stored within the device can be easily visualized by the angler. It is yet another object of the present invention to provide such a snell holding and storing device that will float if inadvertently tossed into the water.

The device of the present invention has obtained these objects. It provides for a snell holding and storing device that comprises an inner holder portion and an outer holder portion. The inner holder portion includes a snell holder portion that extends downwardly and into the outer holder portion when the inner portion and the outer portion are attached to one another. The outer holder portion is comprised of a material that allows the user to visualize the contents of the device. The snell holder portion provides a plurality of transversely-disposed and circumferentially-cut slots for retention of a snell within such cuts or slots.

The foregoing and other advantages of the snell holding and storing device of the present invention will be further apparent from the detailed description that follows.

DETAILED DESCRIPTION

Figure 1:
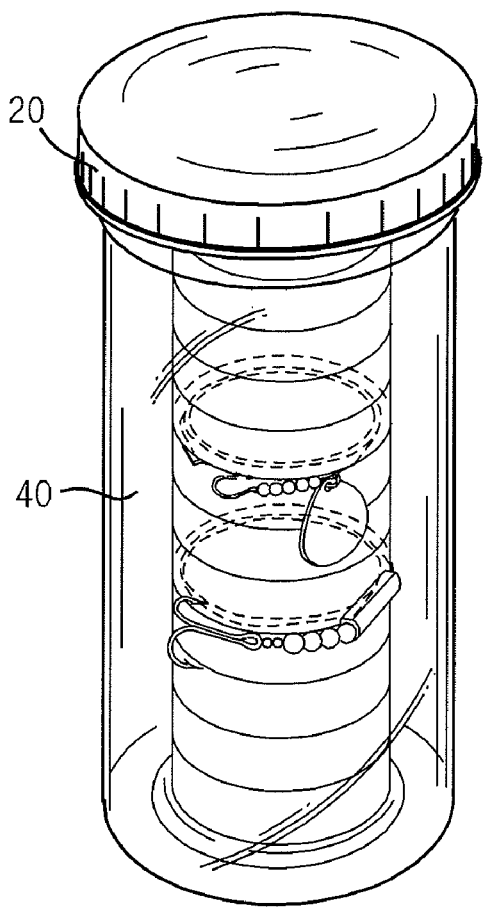
FIG. 1 is a front and top perspective view of the first preferred embodiment of a snell holding and storing device that is constructed in accordance with the present invention and illustrating the two principal portions of the device being attached to one another.
Figure 2:
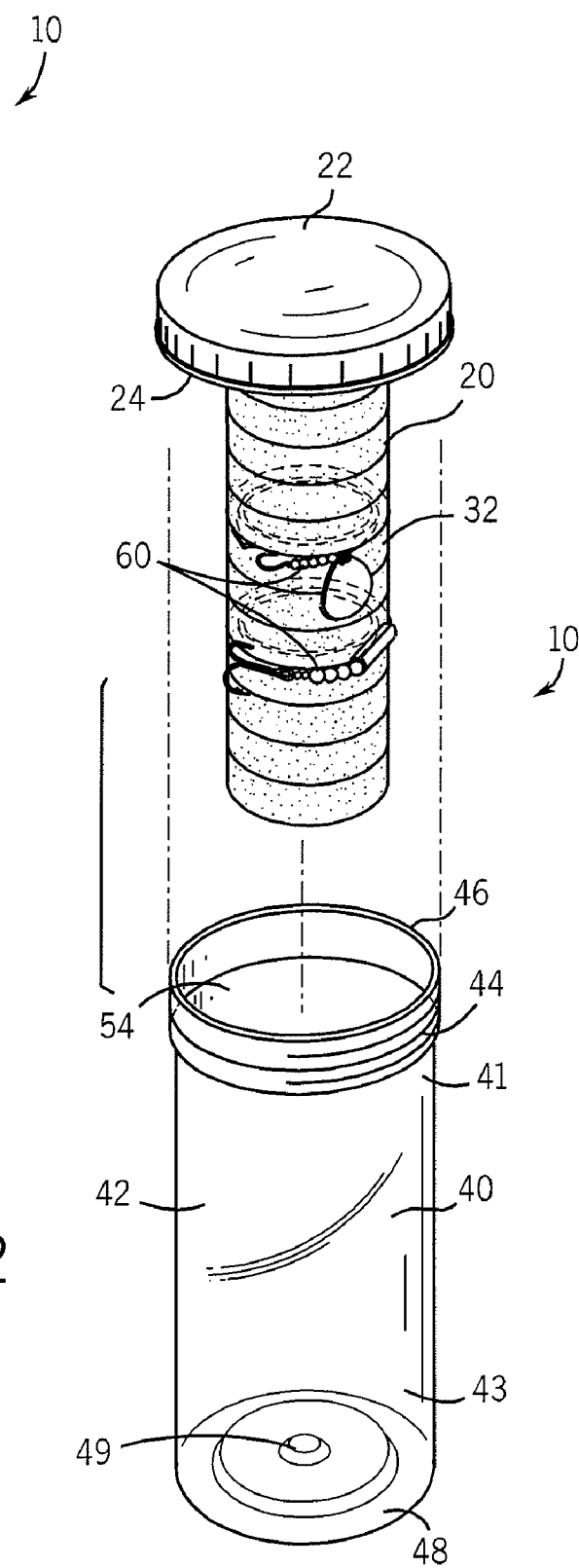
FIG. 2 is a view of the snell holding and storing device shown in FIG. 1 and illustrating the two principal portions of the device being separated.

Referring now to the drawings in detail, wherein like numbered elements refer to like elements throughout, FIGS. 1 and 2 illustrate a first preferred embodiment of the snell holding and storing device, generally identified 10, that is constructed in accordance with the present invention. As shown, the snell holding and storing device 10 comprises two primary elements, an inner holder portion 20 and an outer holder portion 40. FIG. 1 shows the inner holder portion 20 sealingly secured to the outer holder portion 40 and FIG. 2 shows the inner holder portion 20 separated and removed from the outer holder portion 40.

Figure 3:
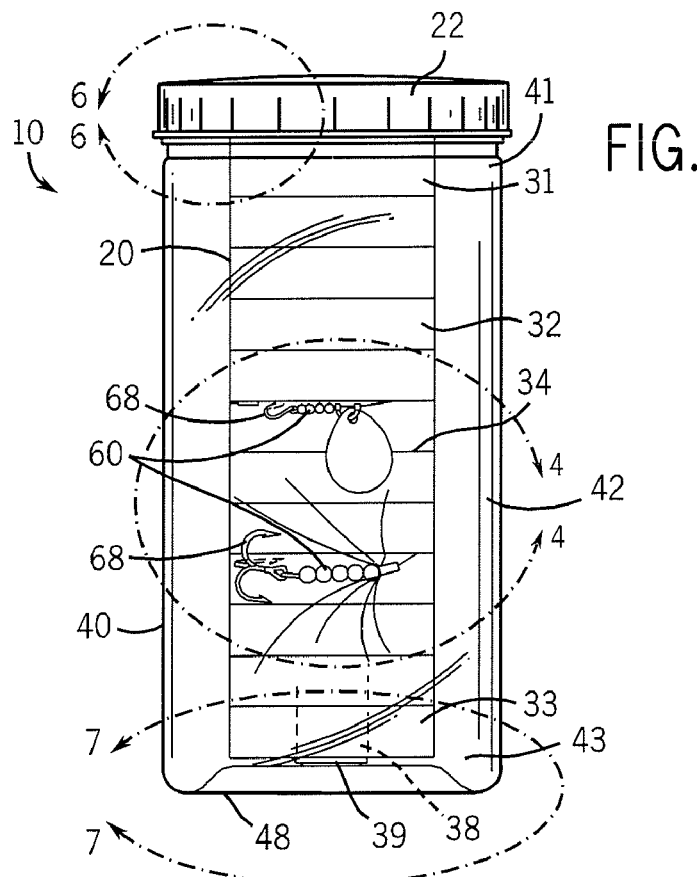
FIG. 3 is a front elevational view of the snell holding and storing device shown in FIGS. 1 and 2.

Referring also to FIG. 3, it will be seen that the outer holder portion 40 is essentially a jar-like structure that is preferably made of a clear and resilient plastic material. Such a clear material could be neoprene or polyethylene, for example, but such is not a limitation of the present invention. The purpose of using such material is to allow the user to easily visualize the contents of the device 10 through the outer holder portion 40. The outer holder portion 40 comprises a cylindrically-shaped and continuous sidewall 42, the sidewall 42 including an uppermost portion 41 and a lowermost portion 43. The lowermost portion 43 is integrally-formed with a floor 48 of the outer holder portion 40. In this first preferred embodiment, an upwardly extending projection 49 is centrally-disposed on the substantially round floor 48 within the outer holder portion 40. See FIG. 2. The uppermost portion 41 of the sidewall 42 includes outer threads 44 that allow the outer holder portion 40 to be sealingly secured to a like-threaded object, as will be apparent later in this detailed description. The uppermost portion 43 of the sidewall 42 terminates in a generally circular opening 46. From this opening 46, the inside 54 of the outer holder portion 40 is made fully accessible.

Figure 6:
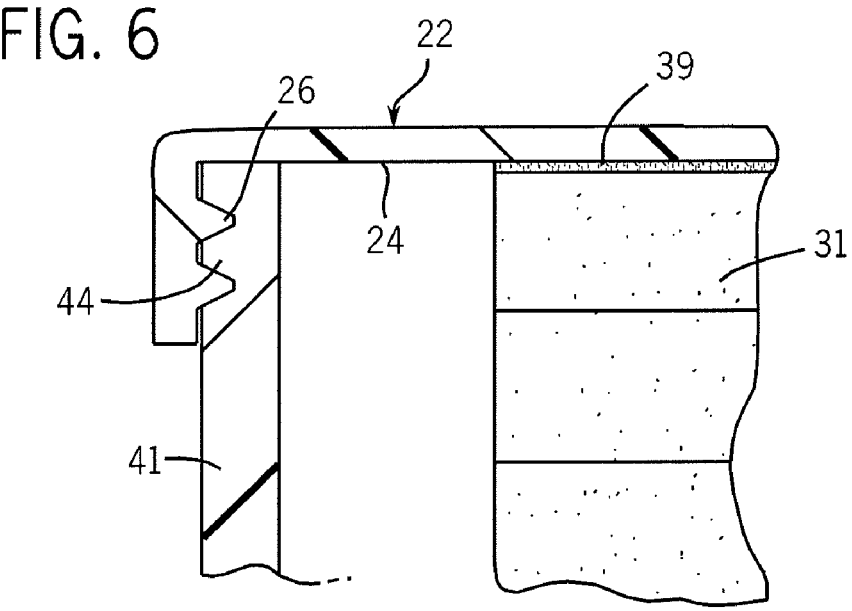
FIG. 6 is an enlarged and cross-sectioned partial front elevational view of the snell holding and storing device illustrated in FIGS. 1-5 and taken along line 6-6 of FIG. 3 and showing how the inner and outer portions are connected together.

In the preferred embodiments illustrated, the inner holder portion 20 comprises a cap-like member 22, the cap-like member 22 having an underside 24. The underside 24 of the cap-like member 22 includes inner threads 26, the inner threads 26 of the cap-like member 22 being functionally adapted to be threadably engaged with the outer threads 44 of the outer holder portion 40. See FIG. 6. The inner holder portion 20 is thus preferably sealingly attachable to and detachable from the outer holder portion 40 by rotating the cap-like member 22 relative to the outer holder portion 40 in a twisting fashion. However, the attachment means of the present invention is not limited to a threadably engageable configuration. Other attachment means could be used without deviating from the scope of the present invention.

Figure 7:
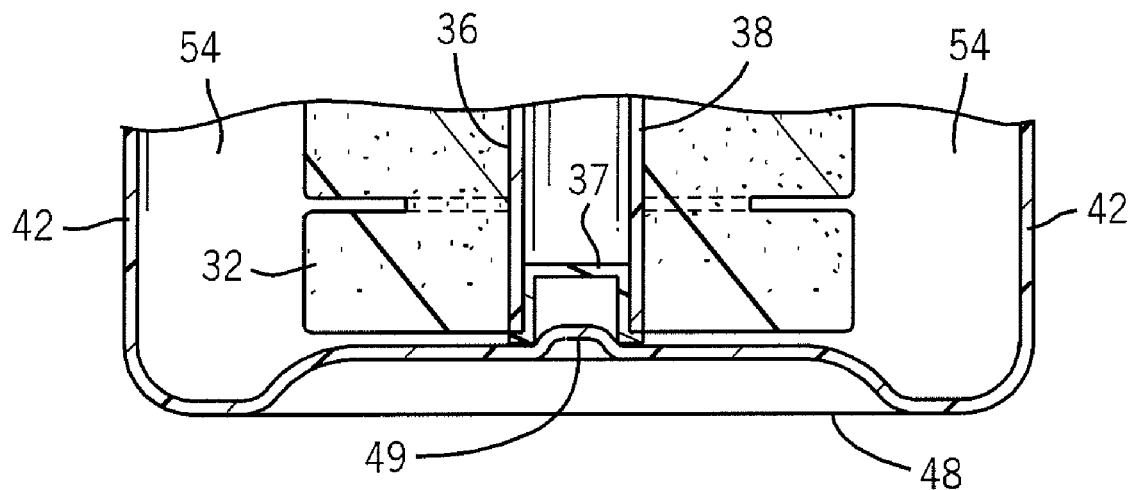
FIG. 7 is an enlarged and cross-sectioned partial front elevational view of the snell holding and storing device illustrated in FIGS. 1-6 and taken along line 7-7 of FIG. 3 and showing the relationship between the inner and outer portions at the floor of the outer portion.
Figure 8:
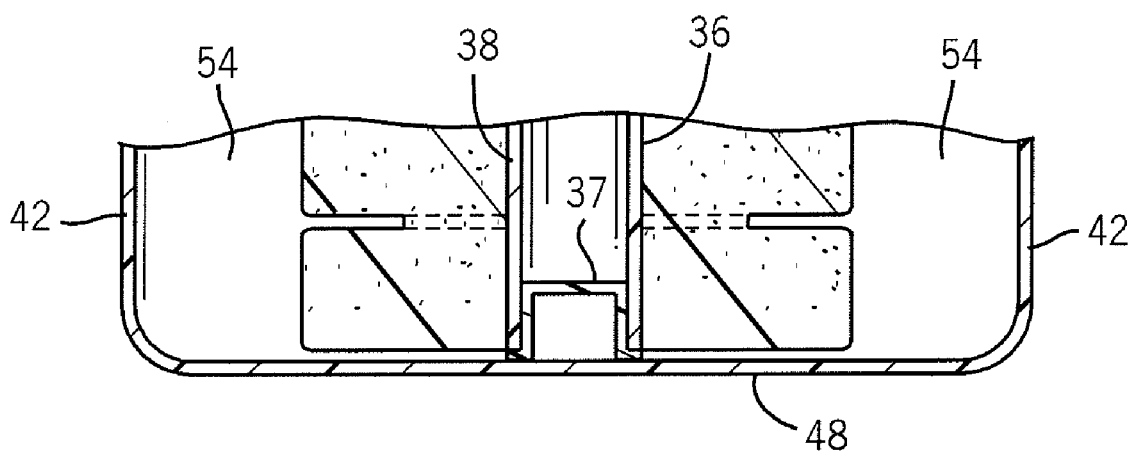
FIG. 8 is an enlarged and cross-sectioned partial front elevational view of a second preferred embodiment of the snell holding and storing device, this view being similar to that shown in FIG. 7.

Secured generally perpendicularly to the underside 24 of the cap-like member 22 is the snell holder portion 32. The snell holder portion 32 includes an uppermost portion 31 and a lowermost portion 33. The uppermost portion 31 of the snell holder portion 32 is secured to the cap-like member 22 by any acceptable means available in the industry. The preferred embodiment contemplates that the snell holder portion 32 is glued to the cap-like member 22 using an acceptable waterproof or water resistant adhesive 39 after the underside of the cap-like member 22 has been brushed to improve adhesion. Again, see FIG. 6. However, it is to be understood that such is not a limitation of the present invention. To improve the relative rigidity of the snell holder portion 32, an axially-disposed pipe-like structure 38 extends axially within a hollow center 36 of the snell holder portion 32. That portion of the pipe-like structure 38 nearest the cap-like member 22 would similarly be adhered to the cap-like member 22. At the lowermost portion 33 of the snell holder portion 32, a small hollow protective member 37 may be inserted into the pipe-like structure 38 to allow the snell holder portion 32 to remain properly "centered" within the outer holder portion 40 when the inner holder portion 20 is secured to the outer holder portion 40. That is, when the inner holder portion 20 is attached to the outer holder portion 40, as shown in FIGS. 1, 3 and 7, the holder portion 32 extends generally downwardly into the inside 54 of the outer holder portion 40. At the lowermost portion 33 of the snell holder portion 32, and at the point that the hollow protective member 37 and the pipe-like structure 38 are in contact with the floor 48 of the outer holder portion 40, the upwardly extending projection 49 is centrally-disposed on the substantially round floor 48 within the outer holder portion 40 and "captures" the hollow protective member 37. This maintains the positioning of the snell holder portion 32 and relieves it of stresses that may be imposed on it at the point of its attachment to the cap-like structure 22. Some deformation of the cap-like structure 22 may also result as is shown in FIG. 3. In a second preferred embodiment, shown in FIG. 8, the floor 48 is generally flat, but again showing the snell holder portion 32, together with the hollow protective member 37 and the pipe-like structure 38 contained within it, would also be in forced contact with the floor 48. When the inner holder portion 20 is separated or detached from the outer holder portion 40 in either preferred embodiment, the snell holder portion 32 can be fully exposed as is shown in FIG. 2.

In either preferred embodiment, the snell holder portion 32 is comprised of a single piece of cylindrically-shaped foam material. This piece of material may be a solid piece of foamed plastic material, a plurality of attached laminations or a cored piece of material, any of which would be acceptable for the intended purpose if formed in the cylindrical shape shown. A typical foamed plastic could be polyurethane or polystyrene, for example, but such is not a limitation of the present invention.

The real benefit of using a foamed plastic type of material is to allow one or more of the hooks 68 of a snell lure 66 to be securely, but removably, imbedded into the snell holder portion 32 when the snell 60 is properly attached to the snell holder portion 32. See FIG. 3. The use of such material minimizes damage that would otherwise be imparted to the snell holder portion 32 during successive attachments and detachments of a snell 60 to and from the holder portion 32. A typical snell 60 is more clearly illustrated in FIG. 5 which shows the snell 60 comprising a secondary length of fishing line 62 having a snell attachment means 64 at one end of the line 62 and a lure 66 with hooks 68 at the opposite end of the line 62.

Figure 4:
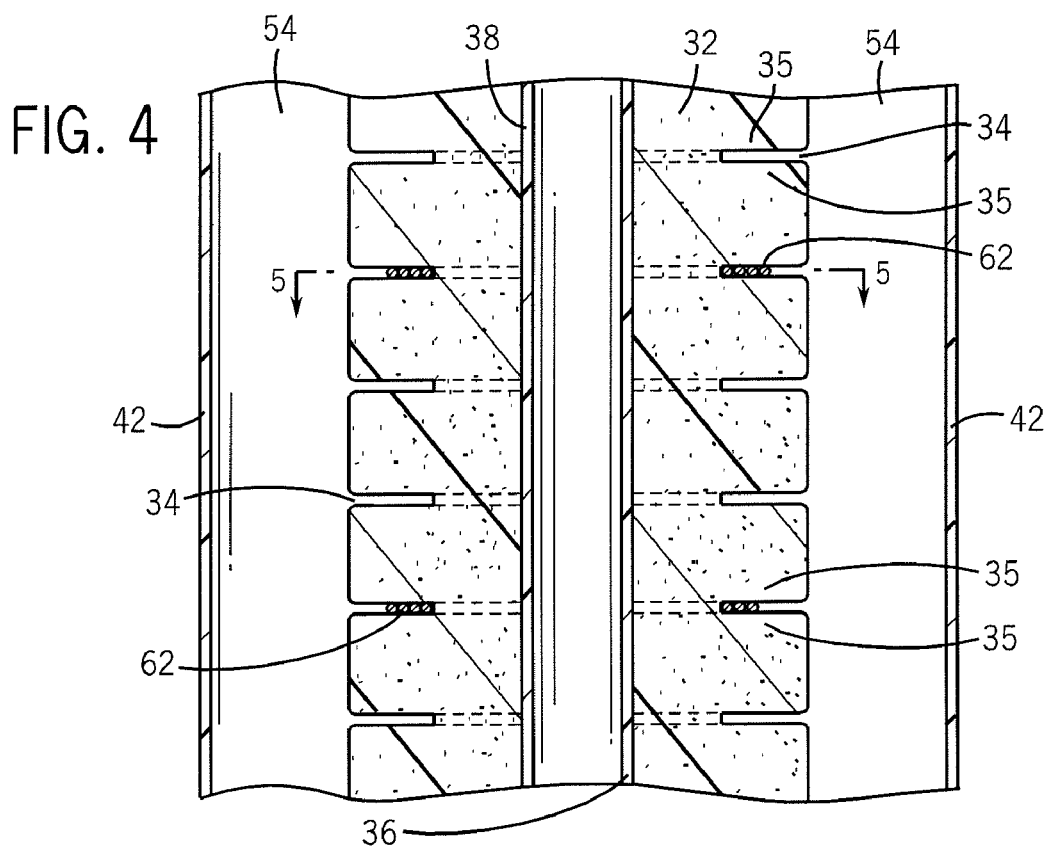
FIG. 4 is an enlarged partial front elevational view of the snell holding and storing device shown in FIGS. 1-3 and taken along line 4-4 of FIG. 3.
Figure 5:
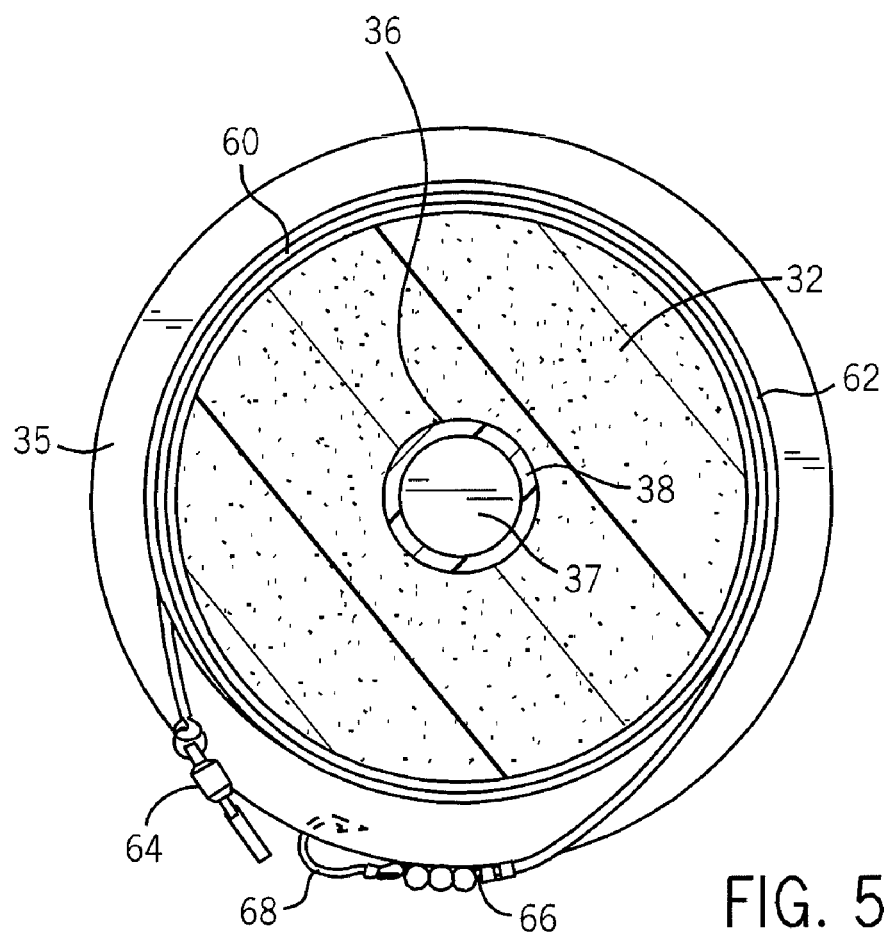
FIG. 5 is a top plan and cross-sectioned view of a portion of the snell holding and storing device shown in FIGS. 1-4 and taken along line 5-5 of FIG. 4.

Referring now to FIG. 4, another equally important feature of the device 10 of the present invention is shown. More specifically, FIG. 4 illustrates a plurality of transversely-disposed and circumferentially-cut slots 34 that are defined within the snell holder portion 32, the snell holder portion 32 being constructed of a resilient foamed plastic material as will be apparent later in this detailed description. Each such slot 34 is used to retain a single snell 60 within it. Although each slot 34 is shown in FIG. 4 as having some width to it, such illustration is for purposes of explanation only. It is to be understood that each slot 34 is really just a simple circumferential "cut" that is made within the snell holder portion 32. In this fashion, the snell holder portion 32 material 35 that is disposed to either side of the slot 34 is displaced by the snell 60 when the snell 60 is attached, this resilient material 35 effectively "pinching" the snell 60 when the snell 60 is attached as intended. As shown in FIG. 5, it will be seen that the snell 60 is wound about the snell holder portion 32 and within the slot 34 such that the snell 60 is securely held within this slot 34. The snell 60 will remain attached to the snell holder portion 32 until the user desires to remove the snell 60 from the snell holder portion 32. In this configuration, even a conventional leader (not shown), without any hook-like structure forming a part of the leader, can be securely held within a slot 34 by virtue of the material 35 that resiliently pinches the leader within the slot 34.

It will also be appreciated that, once a plurality of snells 60 are attached to the snell holder portion 32, as is shown in FIG. 3, the device 10, when properly assembled, would float if inadvertently dropped into the body of water that is being fished, the inner holder portion 20 being sealingly attached to the outer holder portion 40 and the floating device 10 then being easily retrievable by the angler. It should also be noted that the length of the device 10 is easily variable, depending upon the number of snells 60 that are intended to be retained within the device 10. Accordingly, the specific length and overall diameter of the device 10 is not a limitation of the present invention. Additionally, the snell holder portion 32 and the cap-like member 22 are each preferably fabricated from brightly-colored materials to aid the user in locating the device 10 during use.

In application, the user would anchor a hook 68 of the lure 66 to the snell holder portion 32 by inserting the hook 68 into the foamed plastic material of the snell holder portion 32 at a point that is near to one of the slots 34. See FIG. 5. The line 62 of the snell 60 would then be wound about the snell holder portion 32, the line 62 being received by and captured within the slot 34. This continues until the line end 64 is the only portion of the snell 60 remaining. The inner holder portion 20 is then positioned above the outer holder portion 40, as is shown in FIG. 2, and then the snell holder portion 32 is lowered into the inside 54 of the outer holder portion 40. The threads 26 of the cap 22 are engaged with the threads 44 of the outer holder portion 40 until the cap 22 is tightly secured to it. The fully engaged device 10 will appear as it does in FIG. 1. The snell holder portion 32 will remain properly centered within the outer holder portion as is shown in FIG. 7 and/or FIG. 8. The user will then be able to visualize the snells 60 contained within the device 10. If the user wishes to remove a snell 60 from the device 10, the reverse of the foregoing steps is followed.

In view of the foregoing, it will be apparent that there has been provided a new, useful and non-obvious snell holding and storing device that provides for the quick and easy attachment of an individual snell to a portion of the device; that provides such a snell holding and storing device that also permits the reliable wrapping of a snell without the risk of snagging of the hooks of the lure during wrapping or removal of the snell from the holder; that provides such a snell holding and storing device that allows a plurality of snells to be held and stored in this fashion; that provides such a snell holding and storing device that is made from a minimal number of elements and that requires a minimal number of steps to use; that provides such a snell holding and storing device that is durable and sturdy for use in the field; that provides such a snell holding and storing device that includes a clear, see-through portion such that the snells being held and stored within the device can be easily visualized by the angler; and that provides such a snell holding and storing device that is sealingly assembled such that it will float if inadvertently tossed into the water.

The details of the invention having been disclosed in accordance with the foregoing, I claim:

1. A snell holding and storing device that comprises:
   an inner holder portion,
   an outer holder portion, the outer holder portion having a floor,
   means for sealingly attaching the inner holder portion to the outer holder portion,
   a snell holder portion, the snell holder portion being attached to the inner holder portion and extending downwardly and into the outer holder portion when the inner portion and the outer portion are attached to one another, the snell holder portion further comprising a resilient foamed plastic material having a hollow center disposed axially within the snell holder portion and having a lowermost portion, the snell holder portion further comprising a plurality of substantially transversely-disposed and circumferentially-cut slots defined within the resilient foamed plastic material for pinching and retaining a snell within each such slot for organizing a plurality of snells disposed on said snell holder portion,
   a pipe-like structure extending axially within the hollow center of the snell holder portion, a portion of the pipe-like structure being disposed at the lowermost portion of the snell holder portion,
   a hollow protective member that is inserted into the portion of the pipe-like structure that is disposed at the lowermost portion of the snell holder portion, and
   an inwardly extending projection disposed on the floor within the outer holder portion,
   wherein engagement of the hollow protective member with the inwardly extending projection of the outer holder portion centers the inner holder portion relative to the outer holder portion and stabilizes an axial position of the inner holder portion relative to the outer holder portion.

2. The snell holding and storing device of claim 1 wherein the outer holder portion is comprised of a material that allows the user to visualize the contents of the device.

3. The snell holding and storing device of claim 1 wherein the outer holder portion is a jar-like structure that is made of a clear and resilient plastic material.

4. The snell holding and storing device of claim 1 wherein the outer holder portion comprises a cylindrically-shaped and continuous sidewall, the sidewall including an uppermost portion and a lowermost portion, the lowermost portion being integrally-formed with the floor and the inwardly extending projection being centrally disposed and integrally-formed on the floor.

5. The snell holding and storing device of claim 4 wherein the uppermost portion of the sidewall of the outer holder portion comprises outer threads that allow the outer holder portion to be secured to a like-threaded object.

6. The snell holding and storing device of claim 5 wherein the inner holder portion comprises a cap-like member having inner threads that are functionally adapted to engage the outer threads of the outer holder sidewall.

7. The snell holding and storing device of claim 1 wherein the snell holder portion comprises a brightly-colored foamed plastic material.

8. A snell holding and storing device that comprises:
an inner holder portion, the inner holder portion comprising a round cap-like member having an underside and a substantially cylindrically-shaped snell holder portion, the snell holder portion having a length and being secured to the underside of the cap-like member and comprising a hollow that extends axially within and along the length of the snell holder portion, the snell holder portion further comprising a resilient foamed plastic material having a plurality of substantially transversely-disposed and circumferentially-cut slots defined within the resilient foamed plastic material for pinching and retaining a snell within each such slot for organizing a plurality of snells disposed on said snell holder portion,
a pipe-like structure disposed within the snell holder hollow, the pipe-like structure extending from the cap-like member within and along the length of the snell holder portion and having a lowermost portion,
an outer holder portion, the outer holder portion comprising a cylindrically-shaped and continuous sidewall, the sidewall including an uppermost portion and a lowermost portion, the lowermost portion being integrally-formed with a floor,
a hollow protective member that is inserted into the lowermost portion of the pipe-like structure,
an upwardly extending projection that is integrally-formed and centrally-disposed on the floor of the lowermost portion within the outer holder portion, the upwardly extending projection being receivable within the hollow protective member, and
means for releasably attaching the cap-like member of the inner holder portion to the uppermost portion of the outer holder portion sidewall,
wherein receipt of the upwardly extending projection within the hollow protective member centers the inner holder portion relative to the outer holder portion and retains an axial position of the inner holder portion relative to the outer holder portion when the cap-like member of the inner holder portion is attached to the outer holder portion.

9. The snell holding and storing device of claim 8 wherein the outer holder portion is made of a clear and resilient plastic material.

10. The snell holding and storing device of claim 8 wherein the means for releasably attaching comprises the uppermost portion of the sidewall of the outer holder portion having outer threads that allow the outer holder portion to be secured to a like-threaded object and the cap-like member of the inner holder portion has inner threads that are functionally adapted to engage the outer threads of the uppermost portion of the sidewall of the outer holder portion.

11. The snell holding and storing device of claim 8 wherein the resilient foamed plastic material of the snell holder portion comprises a brightly-colored foamed plastic material.

* * * * *